United States Patent [19]

Parks et al.

[11] 4,025,596
[45] May 24, 1977

[54] METHOD FOR PELLETIZING FINELY DIVIDED SOLIDS

[75] Inventors: Christ F. Parks; Kenneth H. Nimerick, both of Tulsa, Okla.

[73] Assignee: The Dow Chemical Company, Midland, Mich.

[22] Filed: Oct. 3, 1973

[21] Appl. No.: 403,127

[52] U.S. Cl. .................................. 264/117; 23/314
[51] Int. Cl.² ............................................. B01J 2/12
[58] Field of Search ............. 264/117; 23/313, 314; 260/17.4 R, 17.4 ST, 42.13, 29.6 PT

[56] References Cited

UNITED STATES PATENTS

| 2,511,901 | 6/1950 | Bunn ................................ 264/117 |
| 2,834,991 | 5/1958 | Hardman ............................. 23/314 |
| 2,946,112 | 7/1960 | Tucker, Jr. et al. ................ 264/117 |
| 3,304,355 | 2/1967 | Pobst, Jr. et al. .................... 23/313 |
| 3,419,507 | 12/1968 | Brown .......................... 260/17.4 ST |

OTHER PUBLICATIONS

"Selecting Binders and Lubricants for Agglomeration Processes, " K. R. Komarek, Chemical Engineering, 12/4/1967, pp. 154–155.

*Primary Examiner*—Robert F. White
*Assistant Examiner*—James R. Hall
*Attorney, Agent, or Firm*—Albin R. Lindstrom

[57] ABSTRACT

Finely divided mineral solids are pelletized by uniformly blending the solids with a binder consisting essentially of an aqueous film forming latex of a water insoluble polymer after which the blend is shaped and dried. The binder preferably also contains a water dispersible agglutinant, such as wheat flour or bentonite.

7 Claims, No Drawings

METHOD FOR PELLETIZING FINELY DIVIDED SOLIDS

BACKGROUND OF THE INVENTION

Finely divided mineral solids, such as coal, present numerous problems. They are difficult to transport or to store because even slight winds blow them around with the obvious ecological difficulties as well as loss of product. The solids are virtually impossible to feed into coking ovens and the like with automatic feed equipment. Many other troubles are known.

One solution of the problem is to pelletize the finely divided solids. Any binder to hold the pellets together must meet several requirements. It must be environmently tolerable. It must provide a pellet with adequate wet and dry strength. The dried pellet must also resist disintegration if rewetted when stored under atmospheric conditions. It must be economically feasible. It must be capable of use a high rate of production.

SUMMARY OF THE INVENTION

The present invention is a method for pelletizing finely divided mineral solids utilizing a novel binder system. The method finds use with a wide variety of such solids including, for example, coal, various mineral ores and other solids.

The novel binder consists essentially of an aqueous film forming latex of a water insoluble polymer. Preferably a water dispersible agglutinant is used with the latex. The agglutinant may be blended with the mineral being pelletized prior to pelletizing or added to the aqueous latex mixture.

The aqueous latexes finding use in this invention are selected from those which are film forming at normal temperatures. For this invention film forming means that the polymer particles are soft enough to coalesce under the forces that arise in the air drying of a latex binder and are capable of binding the finely divided solids into a coherent pellet.

Typical polymers useful herein include those of the interpolymers of alkenyl aromatic monomers, such as styrene and vinyl toluene, with open chain conjugated diolefins of from 4 to 9 carbons atoms such as butadiene and isoprene optionally with at least one monoethylenically unsaturated carboxylic acid, such as acrylic or methacrylic acid; an alkyl acrylate or monomer. As is generally known these film forming latexes for use herein are those of interpolymers containing no more than about 80 weight percent of the alkenyl aromatic monomer. Other useful latexes are those of polyolefins such as polyisobutylene, polyisoprene and the like. Also polyvinyl alkanoates, such as polyvinyl acetate and polyvinyl propionate may be employed. The various polymers of alkyl acrylates and methacrylates that are film forming also may be used. It is a simple task for the skilled worker to identify a useful polymer latex from the multitude that are available. Routine experiments will demonstrate the film formability of a given latex.

In addition, latexes of curable polymers may be employed. Such latexes are represented by polyepoxides, vinyl esters, unsatuarated polyesters and the urethanes. In many such instances the polymeric materials are diluted with a polymerizable monomer, such as styrene, and then dispersed in an aqueous continuous phase. In that event the character of the dispersion is more an emulsion of immiscible fluids than a latex. For purposes of this invention, however, such dispersions are the equivalent of latexes and are intended to be included as useful binders.

The silicones may also be employed as binders in the present invention.

Other additives, such as dyes and pigments, heat and light stabilizers, preservatives and antioxidants, that are conventionally incorporated into latex formulation may be added to the latexes of this invention.

It is an advantage of the present invention that such materials are not generally required.

Aqueous polymer latexes as sold commercially will usually have from about 40 to 60 weight percent polymeric solids and may be used as such. However, the latex employed must practically be capable of being diluted to concentrations as low as 1 to 5%. The amount of dilution required will depend upon the moisture content of the particulated material. Pelletizing technology generally requires that 90% of the available pore space present in the subject material be filled with water. Such water may be added with the binders to supplement water already present in the material to be pelletized. Optimum choice will be easily made after simple preliminary experiments.

The agglutinant to be employed in the preferred compositions will be water soluble, water dispersible or at least water swellable. Included as representative of those materials are the bentonite clays, starch, wheat flour, and pregelatinized starch, glues, natural gums, cellulose ethers and esters, polyacrylamides, lignosulfonates, lignates, lignocelluloses, polyvinylpyrrolidone, casein, and maleic anhydride copolymers.

The optimum concentration of agglutinant when using bentonite or starches appears to be about 1 percent by weight percent of the material being pelletized. Pelletizing different particulates may require more or less agglutinant to obtain a competent pellet.

The binder solids are usually used at concentrations between about 0.1 to about 1.0 weight percent of the solids to be pelletized. The use of an agglutinant with binder will reduce the amount of binder needed to obtain a competent pellet. Higher or lower concentrations may be employed depending on the choice of binder, the composition and particle size of the solids, the properties desired in the pellet and on other known factors. The optimum concentration in any given instance will be easily determined by simple experiment.

Although the latex binder by itself will produce useful pellets, the combination of latex and agglutinant results in a synergistic effect on the cohesive strength of the pellet as well as its wet stability. Thus, the combination is preferred. Many factors may influence the quality of the final pellet. Most significant of these are the pelletizing equipment, the operational conditions and size of the particles used.

One technique to blend binder with solids is to spray the binder onto the solids in a rotating drum tilted away from the vertical. As the solids tumble about the drum they are uniformly coated. The solids will agglomerate into pellets during this blending step. Another technique especially useful with coal fines employs a rotating horizontal disc. As the fines are deposited from a feed hopper or conveyor belt they are sprayed with the binder. As the coated particles drop onto a rotating disc they agglomerate into pellets. By choice of rotational speed the pellets can be thrown off the disc when they reach a desired size. Other techniques may also be used wherein the binder is blended with the fines in conventional mixing equipment and the pellets formed as by compression molding or other known means.

mls of binder solution containing the indicated ingredients.

TABLE I

| Binder | Binder (%) | Agglutinant | Amt. Agglutinant (%) | Pellet Diameter | Pressure to Crush Pellet | Wet Stability* |
|---|---|---|---|---|---|---|
| Latex A | 1 | — | — | ⅝" | 3.75 | None |
| " | 5 | — | — | " | 11.75 | None |
| None | — | Bentonite clay | 4 | ½" | 7.0 | Disintegrated in less than 1 min |
| Latex A | 1 | Bentonite clay | 4 | ⅝" | 18.0 | Trace |
| " | 1.5 | " | 4 | ¾ | 24.0 | Trace |
| Latex B | 1 | — | — | ⅝ | 2.0 | None |
| " | 5 | — | — | " | 10.0 | None |
| " | 1 | Bentonite clay | 4 | " | 14.0 | None |

Latex A = polymer of 47% styrene, 50% butadiene, 3% itaconic acid
Latex B = polymer of 36.5% styrene, 60% butadiene, 2% acrylic acid, 1.5% maleic anhydride
*Disintegration in 10 minutes The quality of a pellet is determined primarily by the dried compressive strength and the resistance to disintegration by rewetting with water. A pellet is considered acceptable if the ⅝ dry pellet will withstand a five pound load before crumbling and resist rewetting for at least 10 minutes while immersed in water.

EXAMPLE 1

Coal particles passing a twenty mesh sieve were used. One hundred fifty grams of coal were placed in a rotating one gallon container tilted about 20 degrees from the horizontal base and rotating at about 44 rpm. A fifty milliliter syringe was used to add the binder. After initial formation of the pellet the container was rotated an additional five to ten minutes to round the edges and compact the pellets. The pellets were then dried in a 200° F oven for two hours.

The amount of pressure required to crush the pelletized coal was determined with a standard weight scale. A coal pellet was placed on the pan of the scale and pressure applied using a three finger point to force the pellet against the pan. The scale reading when the pellet shattered (average of 3 tests) was recorded as the pellet strength.

The water resistance of the pellet was determined by placing it in water. It was considered to have good wet stability if it did not disintegrate within 10 minutes.

The results are shown in the following table using 150 gms of <20 mesh coal. The coal was pelletized using 45

Several different binders were employed in the preparation of pellets by the method of Example 1. The results are shown in the following table. In the table Latex A refers to the latex identified in the previous example. The additives identified by the lower case letters are: (a) is a sodium salt of lignin sold commercially as Indulin C by the West Virginia Pulp and Paper Company; (b) is a methanol free 40 percent by volume aqueous solution of formaldehyde; (c) is an aqueous solution of 80 percent of a nonionic wetting agent-polyethylene glycol ether of a linear alcohol having a HLB value of 12.5 and sold as Tergitol 15-S-7; 15 percent water and 5 percent methanol; (d) is pregelatinized starch; (e) is a nonionic wetting agent-polyethylene glycol ether of a linear alcohol having a HLB value of 8.0 and sold as Tergitol 15-S-3.

TABLE II

Dry Strength and Wet Stability of Various Coal Pellets
Amount of coal used per test: 150 gms
Amount of binder solution per test: 45 mls

| Binder | Pellet Diameter (in) | Pressure to Crush Pellet | Wet Stability |
|---|---|---|---|
| This invention: | | | |
| 20% (a), 10% (b) | 1.0 | 24 | Slowly disintegrates in 10 min |
| 4% (a), 2% (b) | ⅝ | 10 | Slowly disintegrates in 10 min |
| 4% bentonite, 1% Latex A | ⅝ | 18 | Trace disintegration within 10 min |
| 4% bentonite, 1% Latex A, 1000 ppm (a) | ⅝ | 13 | Trace disintegration within 10 min |
| 4% bentonite, 1% Latex A, 1000 ppm (c) | ½ | 8 | Trace disintegration within 10 min |
| 4% attapulgite, 1% Latex A, 1000 ppm (a) | ¾ | 11 | No disintegration within 10 min |
| 4% wheat flour, 1% Latex A, 1000 ppm (a) | ⅝ | 18 | No disintegration within 10 min |
| 3% bentonite, 1% wheat flour, 1% Latex A | ⅝ | 18.5 | Trace disintegration within 10 min |
| 3% bentonite, 1% (d) 1% Latex A | ¾ | 26 | Trace disintegration within 10 min |
| 3% bentonite, 1% wheat flour, 1000 ppm, (e) 1% Latex A | ½ | 14 | No disintegration within 10 min |
| For Comparison: | | | |
| 4% bentonite, 0.1% polyacrylamide | ¾ | 14 | Disintegrated in less than 2 min |
| 4% bentonite | ½ | 7 | Disintegrated in less than 1 min |
| 4% bentonite, 1000 ppm (a) | ⅝ | 8 | Disintegrated in less than 1 min |
| 4% wheat flour | ½ | 10 | Trace disintegration within 10 min |
| 3% bentonite, 1% wheat four | ⅝ | 12 | Disintegrated in less than 1 min |

What is claimed is:

1. A method for pelletizing finely divided mineral solids, comprising:
    a. blending said finely divided mineral solids with a water dispersible agglutinant dispersed in an aqueous film forming latex of a water insoluble interpolymer of an alkenyl aromatic monomer, an open chain conjugated diolefin of from 4 to 9 carbon atoms and a monoethylenically unsaturated carboxylic acid,
    b. forming pellets of said mineral solids and blend, and
    c. drying said formed pellets.

2. The method claimed in claim 1 wherein said solids are finely divided coal.

3. The method claimed in claim 1 wherein said agglutinant is bentonite clay.

4. The method claimed in claim 1 wherein said agglutinant is wheat flour.

5. The method claimed in claim 1 wherein said agglutinant is pregelatinized starch.

6. The method claimed in claim 1 wherein said interpolymer is composed of styrene, butadiene and itaconic acid.

7. The method claimed in claim 1 wherein said interpolymer is composed of styrene, butadiene, acrylic acid and methacrylic acid.

* * * * *